J. HUDRLE.
POULTRY DISINFECTING DEVICE.
APPLICATION FILED JULY 2, 1912.
1,061,540.
Patented May 13, 1913.
2 SHEETS—SHEET 1.
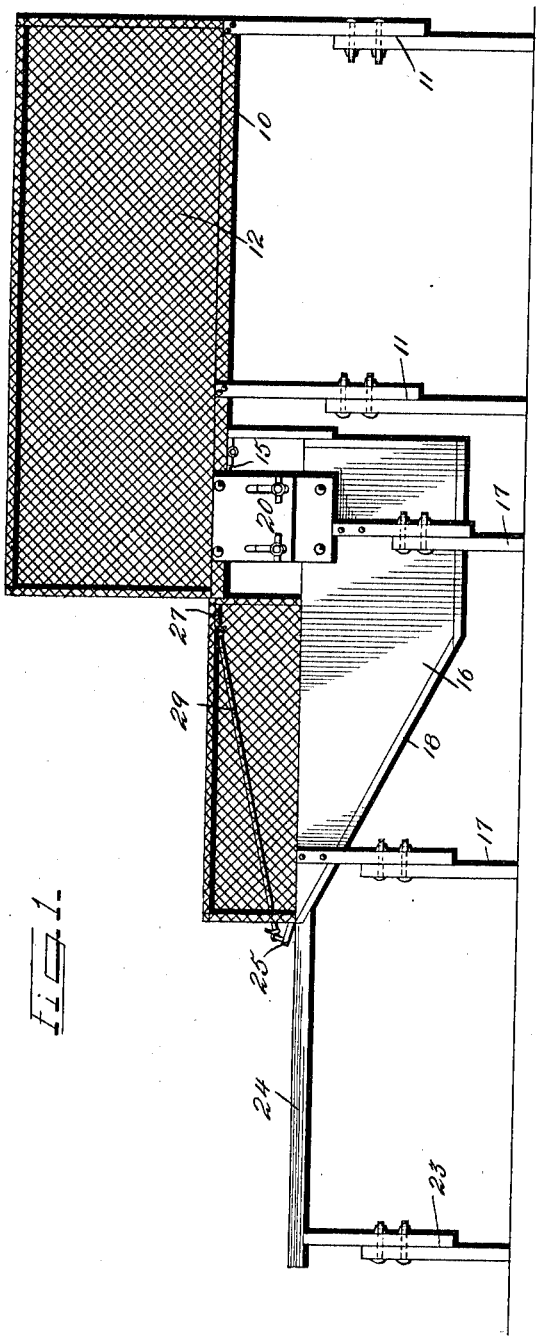
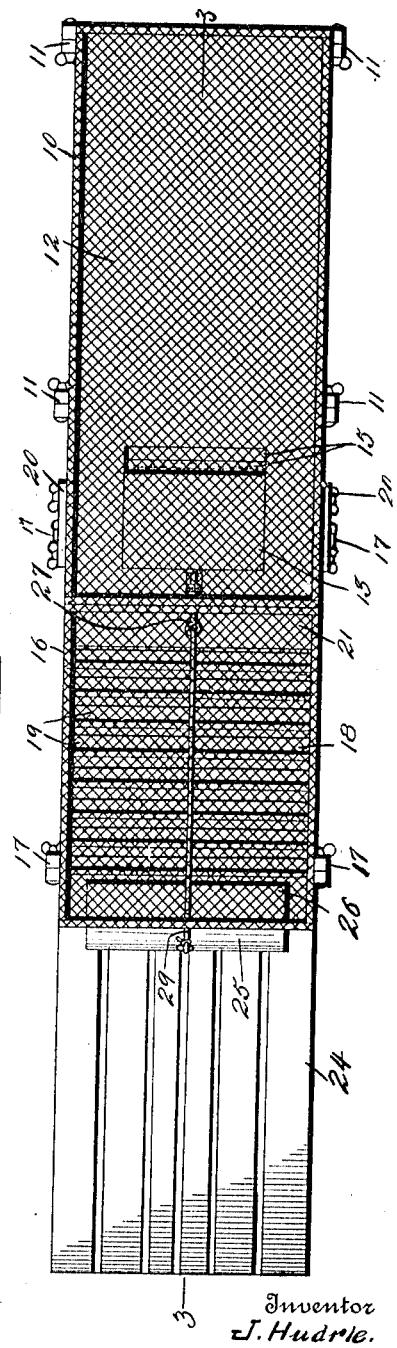
Inventor
J. Hudrle.
Witnesses
By 
Attorneys

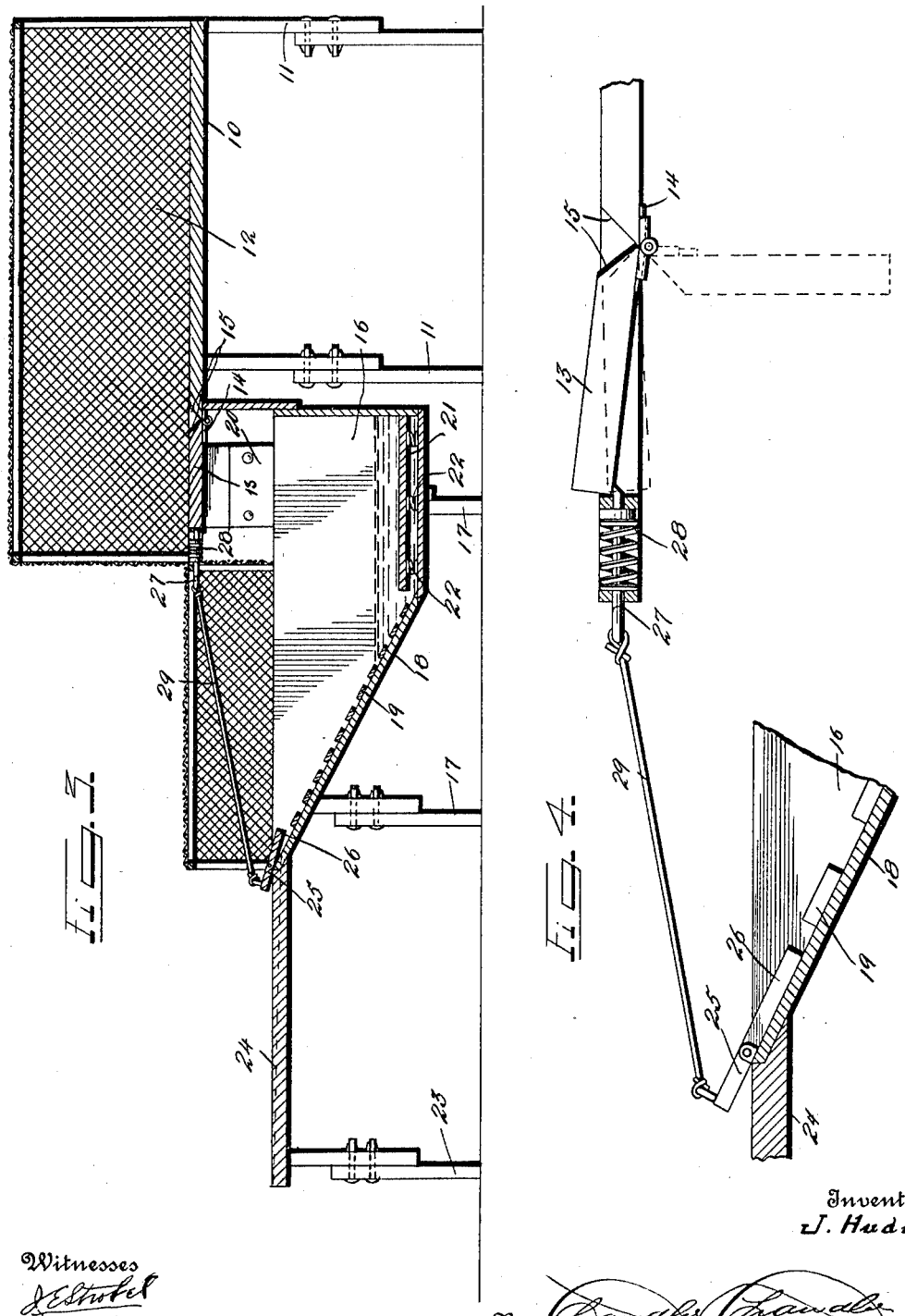

UNITED STATES PATENT OFFICE.

JAMES HUDRLE, OF HAUGEN, WISCONSIN.

POULTRY-DISINFECTING DEVICE.

1,061,540. Specification of Letters Patent. Patented May 13, 1913.

Application filed July 2, 1912. Serial No. 707,389.

*To all whom it may concern:*

Be it known that I, JAMES HUDRLE, a citizen of the United States, residing at Haugen, in the county of Barron, State of Wisconsin, have invented certain new and useful Improvements in Poultry-Disinfecting Devices; and I do hereby declare the following to be a full, clear, and exact description of the invention, such as will enable others skilled in the art to which it appertains to make and use the same.

This invention relates to improvements in poultry culture, and has particular reference to a device for dipping the poultry as they leave the house, to rid them of vermin.

The principal object of the invention is to provide simple means operated by a fowl leaving the dipping tank for setting a trap through which the next fowl will be dropped into the tank.

Other objects and advantages will be apparent from the following description and with particular reference to the accompanying drawings.

In the drawings: Figure 1 is a side elevation of my invention, Fig. 2 is a top plan view, Fig. 3 is a vertical longitudinal section on the line 3—3 of Fig. 2, Fig. 4 is an enlarged detail view of the trap tripping device.

Referring particularly to the drawings, 10 represents a runway which is supported by adjustable legs 11, said runway being covered by wire netting 12, so that the fowls cannot leave the runway but are forced to pass to the outer end thereof, which is closed by wire netting, as shown. The inner end of the runway is open, and is adapted to be placed over the outlet opening from the poultry house, or one pane of a window may be removed, and the end of the runway placed thereover, the remaining face of the window being darkened. In the outer end of the runway is hinged a drop door 13, normally held in horizontal position by means of a spring 14. The hinged end of the door, and the adjacent edge of the runway are beveled as at 15, so that the doors may swing slightly above the level of the runway, for a purpose which will appear later.

Supported on the adjustable legs 17, beneath the outer end of the runway is a dipping tank 16, which is adapted to contain a disinfectant. The forward part of the bottom of the dipping tank is upwardly inclined as indicated at 18, and arranged on the inside of this incline is a ladder like structure 19, on which the fowls may pass upwardly out of the tank. On each side of the tank, adjacent the drop door 13, are the guards 20, which prevent the fowl escaping between the runway and the tank. In the bottom of the tank is a false bottom 21, supported by springs 22, so as to relieve the shock when a fowl strikes to the bottom. Extending from the upper end of the inclined bottom, and supported on the legs 23, is a runway 24, from which the fowl may fly down to the ground, said runway having grooves in its upper face, so that the disinfectant which may drip from the fowls may run back into the tank. Pivotally mounted at the upper end of the inclined bottom is an angular trip plate 25, normally held in the position shown by the weight of the portion 26. Slidably mounted in the outer end of the runway 10, adjacent the free end of the drop door is a detent 27, normally held in projected position by means of a spring 28, the opposite end of the detent being connected by means of a cord or wire 29 to the outer end of the trip 25.

The operation of the device may be briefly described as follows: In normal position the detent is in such position that the drop door is on a level with the runway, and engages frictionally against the front edge of the free end of the door. A fowl stepping on the door would be plunged into the tank, and thoroughly cleansed by the disinfectant within the tank. The fowl would then climb out of the tank by means of the ladder 19. When the fowl has dropped from the door into the tank, the door is thrown upwardly by the spring 14, and by means of the beveled edges of the hinged connection, the door will swing above the level of the runway, and when it drops back will rest on the end of the detent, so that should another fowl be near the door at this instant, the door would not give way, so that only one fowl at a time would go through the tank. The fowl climbs out of the tank, steps on the trip 25, which pulls the detent from under the drop door, thus permitting the door to fall of its own weight to horizontal position, and to frictionally engage against the detent. The next succeeding fowl that steps on the door will be precipitated into the tank. Thus should it happen, for some reason or other, that the other chickens would not follow, the door would be in proper position when they decided to pass out of the poultry house. Were the door allowed to rest permanently on the detent, the next succeeding fowl could not operate the door, hence the provision of the trip to shut the door, whether another fowl follows or not.

What is claimed is:

1. A poultry disinfecting device comprising a covered runway having one end open and the other closed, a hinged drop door in the floor of the said closed end, a disinfecting tank below the drop door, an exit runway in the tank, a trip at the upper end of the tank runway, a spring pressed detent for the drop door, resilient means for holding the door in horizontal position, the hinged edge of the door being cut away to permit same to move above the level of the runway and rest on the detent at times, and connections between the trip and detent.

2. The combination with a dipping tank and a runway leading thereto, of a hinged drop door in the runway, a spring for holding the door normally on a level with the runway, the hinge carrying portions of the door and runway being beveled to permit the door to swing above the runway by its own impetus, a spring-pressed sliding detent for holding the door above the runway, and a fowl actuated trip, connected to the detent for withdrawing the detent, whereby when a fowl steps on the door, the door will drop to plunge the fowl into the tank, and then swing above the runway to rest on the detent the subsequent movement of the trip withdrawing the detent to permit the door to assume its normal level position.

In testimony whereof, I affix my signature, in presence of two witnesses.

JAMES HUDRLE.

Witnesses:
 LOUIS KNADLE,
 JOE BARTES.

Copies of this patent may be obtained for five cents each, by addressing the "Commissioner of Patents, Washington, D. C."